United States Patent [19]

Jen et al.

[11] Patent Number: 5,069,820
[45] Date of Patent: * Dec. 3, 1991

[54] THERMALLY STABLE FORMS OF ELECTRICALLY CONDUCTIVE POLYANILINE

[75] Inventors: Kwan-Yue A. Jen, Succasunna; Ronald L. Elsenbaumer, Morristown, both of N.J.

[73] Assignee: Allied-Signal Inc., Morris Township, Morris County, N.J.

[*] Notice: The portion of the term of this patent subsequent to Aug. 8, 2006 has been disclaimed.

[21] Appl. No.: 82,886

[22] Filed: Aug. 7, 1987

[51] Int. Cl.$^5$ .......................... H01B 1/00; H01B 1/06
[52] U.S. Cl. ..................................... 252/500; 252/518; 252/519
[58] Field of Search ..................... 252/500, 518, 519; 528/422; 524/157, 158

[56] References Cited

U.S. PATENT DOCUMENTS

| | | |
|---|---|---|
| 3,963,498 | 6/1976 | Trevoy . |
| 4,025,463 | 5/1977 | Trevoy .............................. 252/500 |
| 4,615,829 | 10/1986 | Tamura et al. ..................... 252/500 |
| 4,798,685 | 1/1989 | Yaniger . |

FOREIGN PATENT DOCUMENTS

| | | |
|---|---|---|
| A30035713 | 2/1981 | European Pat. Off. . |
| 0035713 | 9/1981 | European Pat. Off. . |
| A20152632 | 12/1984 | European Pat. Off. . |
| 0152632 | 2/1985 | European Pat. Off. . |
| A20259813 | 9/1987 | European Pat. Off. . |
| 62-12073 | 1/1987 | Japan . |
| 62-47109 | 2/1987 | Japan . |

OTHER PUBLICATIONS

S. Li et al., "Soluble Polyaniline", Synthetic Metals, 20 (1987), 141–149.
K. Hyodo et al., "Short Communication . . . High Ion Selective Electrochemical . . . ", Electro Acia, vol. 33, No. 1, pp. 165–166, 1983.
L. T. Yu et al., "Conductivite et Constitution Chimique pe Semi–Conducteurs Macromoleculaires", Revue Generale de L'Elec . . . , 1019, vol. 75, No. 9. p. 104.
M. Jozefowicz et al., "Relations entre Proprietes Chimiques et . . . ", Revue Generale de L'Electricite, vol. 75, No. 9, pp. 1008–1013.
D. Muller et al., "Preparation, Proprietes Chimiques et Conduct . . . ", pp. 4087–4091.
L. T. Yu et al., "Etude experimentale de la Conductivite en Couran Continu des Composes Macromoleculaires", Jrnl Polymer Sc. Pt C, No. 16, pp. 2931–2942.
M. Jozefowicz et al., "Proprietes Nouvelles des Polymeres Semi . . . ", J. Poly. Sci. Part C, No. 22, pp. 1187–1195 (1969).
T. Kobayashi et al., "Electrochemical Reactions Concerned with Electrochromism . . . ", J. Electroanal. Chem. 177 (1984), pp. 281–291.
T. Kobayashi et al., "Oxidative Degradation Pathway of Polyaniline Film Electrodes", J. Electroanal. Chem. 177 (1984), pp. 293–297.
F. Cristofini et al., "Proprietes Electrochimiques des Sulfates de Polyaniline", C. R. Acad. Sc. Paris, t. 268 (14 Apr. 1969), pp. 1346–1349.
D. Labarre et al., "Polymeres Conducteurs Organiques Filmogenes a base de Polyaniline", C. R. Acad. Sc. Paris, t. 269 (29 Oct. 1969), pp. 964–969, Series C.
M. Doriomedoff et al., "Conductivite en Courant Continu Des Sulfates De Polyanilines"(#142), pp. 1055–1069.

(List continued on next page.)

*Primary Examiner*—Josephine Barr
*Attorney, Agent, or Firm*—R. C. Stewart, II; G. H. Fuchs; D. L. Webster

[57] ABSTRACT

This invention relates to compositions of thermally stable electrically conductive substituted and unsubstituted polyanilines and to conductive articles formed from such compositions.

64 Claims, 2 Drawing Sheets

OTHER PUBLICATIONS

L. -T. Yu et al., "Conductivite en Courant Continu des Materiaux Macromoleculaires", pp. 470–532 (Chapter 11).

R. de Surville et al., "Produits Oligomeres et Polymeres D'Oxydation des Amines Aromatiques", Ann. Chim. t2, 1967, pp. 5–13.

R. de Surville, "Electrochemical Chains Using Protolytic Organic Semiconductors", Elec. Acta 1958, vol. 13, pp. 1451–1458.

R. de Surville, "Produits D'oxidation Pousee des Amines Aromatique", Ann. Chim., t2, 1967, pp. 149–157.

T. Masatake et al., "Secondary Batteries with Polyaniline Cathods", 8/8/88, *Chemical Abstracts*, vol. 109, No. 6, & Jpn. Kokai Tokkyo Koho JP 63 55,861 (88 55,861) 3/10/88.

TGA OF PAN·OTs UNDER ARGON

TGA of PAN·Cl

THERMALLY STABLE FORMS OF ELECTRICALLY CONDUCTIVE POLYANILINE

BACKGROUND OF THE INVENTION

1. Field of the Invention

This invention relates to thermally stable electrically conductive substituted or unsubstituted polyanilines, and to compositions comprising such polyanilines and other non-electrically conductive polymers. Another aspect of this invention relates to a method of using such polyanilines and compositions to form conducting polymer articles, including films, and to such articles.

2. Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, Tetsuhiko, et al., *J. Electroanal. Chem.*, "Electrochemical Reactions Concerned With Electrochromism of Polyaniline Film-Coated Electrodes", 177 (1984) 281–291, describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Donomedoff, F. Kautier-Cristojini, R. ReSur-vall, M. Jozefowicz, L-T. Yu, and R. Buvet, J. Chim. Phys Physicohim. Brol 68, 1055 (1971); "Continuous Current Conductivity of Macromolecular Materials", L-T. Yu, M. Jozefowicz, and R. Buvet, Chim. Macromol. 1, 469 (1970); "Polyaniline Based Filmogenic Organic Conductive Polymers", D. LaBarre and M. Jozefowicz, C. R. Read. Sci., Ser. C, 269, 964 (1969); "Recently Discovered Properties of Semiconducting Polymers", M. Jozefowicz, L-T. Yu, J. Perichon, and R. Buvet, J. Polym. Sci., Part C, 22, 1187 (1967); "Electrochemical Properties of Polyaniline Sulfates", F. Cristojini, R. De Surville, and M. Jozefowicz, Cr. Read. Sci., Ser. C, 268, 1346 (1979); "Electrochemical Cells Using Protolytic Organic Semiconductors", R. De Surville, M. Jozefowicz, L-T. Yu, J. Perichon, R. Buvet, Electrochem. Ditn. 13, 1451 (1968); "Oligomers and Polymers Produced by Oxidation of Aromatic Amines", R. De Surville, M. Jozefowicz, and R. Buvet, Ann. Chem. (Paris), 2 5 (1967); "Experimental Study of the Direct Current Conductivity of Macromolecular Compounds" L-T. Yu, M. Borredon, M. Jozefowicz, G. Belorgey, and R. Buvet, J. Polym. Sci. Polym. Symp., 16, 2931 (1967); "Conductivity and Chemical Properties of Oligomeric Polyaniline", M. Jozefowicz, L-T. Yu, G. Belorgey, and R. Buvet, J. Polym. Sci., Polym. Symp., 16, 2934 (1967); "Products of the Catalytic Oxidation of Aromatic Amines", R. De Surville, M. Jozefowicz, and R. Buvet, Amm. Chem. (Paris), 2, 149 (1967); "Conductivity and Chemical Composition of Macromolecular Semiconductors", Rev. Gen. Electr., 75 1014 (1966); "Relation Between the Chemical and Electrochemical Properties of Macromolecular Semiconductors", M. Jozefowicz and L-T. Yu, Rev. Gen. Electr., 75 1008 (1966); "Preparation, Chemical Properties, and Electrical Conductivity of Poly-N-Alkyl Anilines in the Solid State", D. Muller and M. Jozefowicz, Bull. Soc. Chem. Fr. 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

In the general field of conducting polymers, it was heretofore believed impossible for thermally stable polyanilines and compositions comprising such polyanilines and one or more thermoplastic polymers which can be fabricated into useful articles by melt blending techniques. Thus, a need exists for thermally stable electrically conductive polyanilines and for techniques to facilitate the fabrication of shaped conductive polyaniline articles, especially articles such as films, fibers and coatings.

SUMMARY OF THE INVENTION

One aspect of the present invention relates to a thermally stable electrically conductive doped polyaniline comprised of an ionized polyaniline backbone polymer and a dopant solute species selected from the group consisting of:

$$R_1-SO_3-$$

wherein $R_1$ is a substituted or unsubstituted organic radical, and to articles formed from this polyaniline.

This invention also relates to a composition comprising the doped polyaniline of this invention and one or more thermoplastic polymers, and to articles formed from this composition.

DETAILED DESCRIPTION OF THE INVENTION

Figure 1:
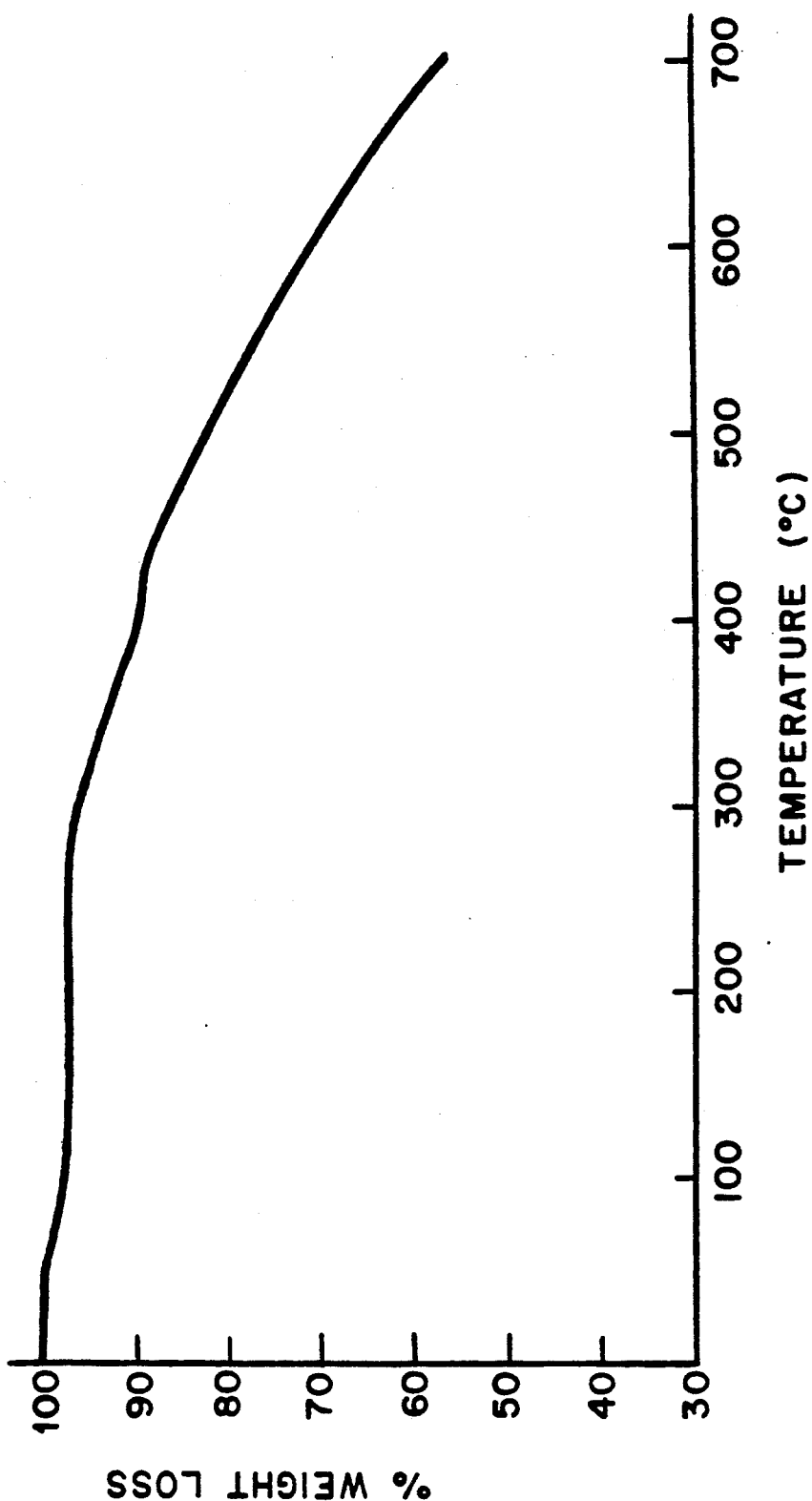
FIG. 1 is a graph showing % weight loss as a function of temperature for polyaniline doped with tosylate anions.

The thermally stable electrically conductive polyaniline of this invention comprises two essential ingredients. One essential ingredient is a substituted or unsubstituted polyaniline. In general, polyanilines for use in the invention are polymers and copolymers of film forming molecular weight derived from the polymerization of unsubstituted and substituted anilines of the Formula I:

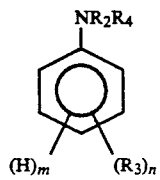

Formula I wherein:
n is an integer from 0 to 5;

m is an integer from 0 to 5 with the proviso that the sum of n and m is equal to 5;

$R_2$ and $R_4$ are the same or different and are hydrogen or alkyl; and $R_3$ is the same or different at each occurrence and is selected from the group consisting of alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, aryloxyalkyl, alkylsulfinylalkyl, alkoxyalkyl, alkylsulfonyl, aryl, arylthio, alkylsulfonylalkyl, arylsulfinyl, alkoxycarbonyl, arylsulfonyl, carboxylic acid, halogen, cyano, sulfonic acid, nitro, alkylsilane or alkyl substituted with one or more sulfonic acid, carboxylic acid, halo, nitro, cyano or epoxy moieties; or any two $R_3$ groups together may form an alkylene or alkenylene chain completing a 3, 4, 5, 6 or 7 membered aromatic or alcyclic ring, which ring may optionally include one or more divalent nitrogen, sulfur, sulfinyl, ester, carbonyl, sulfonyl, or oxygen atoms; or $R_3$ is an aliphatic moiety having repeat units of the formula:

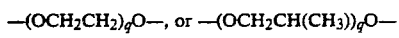

wherein q is a positive whole number.

Illustrative of the polyanilines useful in the practice of this invention are those of the Formulas II to V:

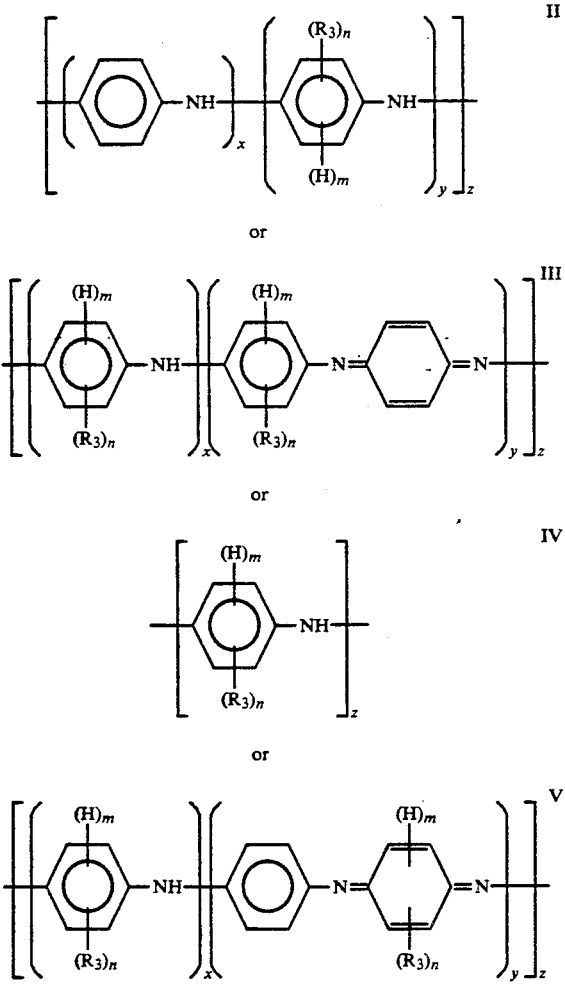

wherein:

n, m, $R_2$, $R_3$ and $R_4$ are as described above;

y is an integer equal to or greater than 0;

x is an integer equal to or greater than about 2, with the proviso that the ratio of x to y is greater than or equal to about 2; and z is an integer equal to or greater than 1.

The following listing of substituted and can be used to prepare polymers and copolymers useful in the practice of this invention.

| | |
|---|---|
| 2-Cyclohexylanilane | 2-Acetylaniline |
| Aniline | 2,5-Dimethylaniline |
| o-Toluidine | 2,3-Dimethylaniline |
| 4-Propanoylaniline | N, N-Dimethylaniline |
| 2-(Methylamino)aniline | 4-Benzylaniline |
| 2-(Dimethylamino)aniline | 4-Aminoaniline |
| 2-Methyl-4-methoxy-carbonylaniline | 2-Methylthiomethylaniline |
| | 4-(2,4-Dimethylphenyl)aniline |
| 4-Carboxyaniline | 2-Ethylthioaniline |
| N-Methyl aniline | N-Methyl 2,4-Dimethylaniline |
| N-Propyl aniline | N-Propyl m-Toluidine |
| N-Hexyl aniline | N-Methyl O-Cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thiomethylaniline |
| m-Hexylaniline | 2,5-Dichloroaniline |
| m-Octylaniline | 3-(n-Butanesulfonic acid) aniline |
| 4-Bromoaniline | |
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Methylthioaniline |
| 5-Chloro-2-methoxy-aniline | 3-phenoxyaniline |
| 5-Chloro-2-ethoxy-aniline | 4-phenoxyaniline |
| N-Hexyl m-Toluidine | N-Octyl m-Toluidene |
| 4-phenylthioaniline | 4-trimethylsilylaniline |

Exemplary of useful $R_2$ and $R_4$ groups are hydrogen, methyl, ethyl, isopropyl, butyl, isobutyl, hexyl, octyl and the like.

Illustrative of useful $R_3$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; alkylsulfinyl, alkylsulfonyl, alkylthio, arylsulfonyl, arylsulfonyl, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethylene, ethoxymethyl, butoxymethyl, propoxyethyl, pentoxybutyl and the like; aryloxyalkyl and aryloxyaryl such as phenoxyphenyl, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitro-ethyl, trifluoromethyl, 3,4-epoxybutyl, cyanomethyl, 3-chloropropyl, 4-nitrophenyl, 3-cyanophenyl, and the like; sulfonic acid terminated alkyl and aryl groups and carboxylic acid terminated alkyl and aryl groups such as ethylsulfonic acid, propylsulfonic acid, butylsulfonic acid, phenylsulfonic acid, and the corresponding carboxylic acids.

Also illustrative of useful $R_3$ groups are divalent moieties formed from any two R groups such as moieties of the formula:

wherein a is an integer from about 3 to about 7, as for example and $-(CH_2)_4-$, $-(CH_2)_3-$ and $-(CH_2)_5-$, or such moieties which optionally include heteroatoms of oxygen, nitrogen, ester, sulfonyl, carbonyl, sulfinyl, and/or sulfur such as $-CH_2SCH_2-$ $-CH_2NHCH_2$, $-SCH_2NHCH_2-$, $-O-CH_2-S-CH_2-$, $-CH_2-S(O_2)CH_2-$, $-CH_2S(O)CH_2-$, $-OC(O)CH_2CH_2$, $-CH_2C(O)CH_2$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparoxazineamine, dihydrobenzoparadiazineamine, dihydrobenzotetrazoleamine, dihydrobenzothiazineamine, benzothiopyranamine, dihydrobenzoxazoleamine and the like. Exemplary of useful $R_3$ groups are divalent alkenylene chains containing 1 to about 3 unsaturated bonds such as divalent 1,3-butadiene and like moieties which may also include one or more oxygen, nitrogen, sulfinyl, sulfonyl, carbonyl, ester, and/or sulfur which form such compounds as benzodiazineamine, benzodiazoleamine, benzotriazepineamine, benzoimidazolylamine, benzoxazoleamine, benzoixazoleamine, benzoxazolylamine, benzotriazineamine, benzoxazineamine, naphthaleneamine, benzopyranamine, benzothiazineamine, anthraceneamine, aminobenzothiopyran, aminobenzodiazine, benzethiopyrone, aminocoumarin, benzothiophene, benzothiodiazoleamine, and the like.

Preferred for use in the practice of this invention are polyanilines of the above Formulas II to V in which:
n is an integer from 0 to about 2;
m is an integer from 3 to 5, with the proviso that the sum of n and m is equal to 5;
$R_2$ is hydrogen, methyl or ethyl;
$R_3$ is alkyl or alkoxy having from 1 to about 12 carbon atoms, cyano, halogen, or alkyl substituted with carboxylic acid or sulfonic acid substituents;
x is an integer equal to or greater than 4;
y is equal to or greater than 0, with the proviso that the ratio of x to y is greater than about 2; and
z is an integer equal to or greater than about 10.

Particularly preferred for use in the practice of this invention are polyanilines of the above Formulas II to V in which:
n is an integer from 0 to 2;
m is an integer from 3 to 5, with the proviso that the sum of n and m is equal to 5;
$R_2$ is hydrogen or methyl;
$R_3$ is alkyl or alkoxy having from 1 to about 4 carbon atoms, or alkyl substituted with carboxylic acid or sulfonic acid substituents
x is an integer equal to or greater than 4;
y is equal to or greater than 0, with the proviso that the ratio of x to y is greater than about 2; and
z is an integer equal to or greater than about 20.

Amongst the particularly preferred embodiments, most preferred for use in the practice of this invention are polyanilines of the above Formulas II to V in which:
n is an integer from 0 to 1;
m is an integer from 4 to 5, with the proviso that the sum of n and m is equal to 5;
$R_2$ is hydrogen
$R_3$ is alkyl or alkoxy from 1 to about 4 carbon atoms;
x is an integer equal to or greater than 4;
y is equal to or greater than 1, with the proviso that the ratio of x to y is greater than about 2; and
z is an integer equal to or greater than about 30. In the most preferred embodiments of this invention, the polyaniline is derived from unsubstituted aniline.

In general, the polyanilines particularly useful in the practice of this invention are those which are of "film forming molecular weight". As used herein, "film forming molecular weight" generally means number average molecular weights which exceed about 15,000. The molecular weight of the substituted or unsubstituted polyaniline at which the polymer will be film forming may vary widely, depending on a number of factors including the number of repeat units, and the number of substituents and the substituent pattern. In general, substituted and unsubstituted polyanilines will be of film forming molecular weight when the number of monomer repeat units is at least about 150. In the preferred embodiments of the invention, the number of aniline repeat units is at least about 75, and in the particularly preferred embodiments, the number of repeat units is at least about 200. Amongst the particularly preferred embodiments, most preferred are those embodiments in which the number of repeat units is at least about 250.

Any form of substituted and unsubstituted polyaniline can be conveniently used in the practice of this invention. Illustrative of useful forms are those described in Green, A. G. and Woodhead, A. E., "Aniline-black and Allied Compounds, Part I", J. Chem. Soc., vol. 101, pp. 1117 (1912) and Kobayashi, et al., "Electrochemical Reactions . . . of Polyaniline Film-Coated Electrodes", J. Electroanal. Chem., Vol 177, pp. 281-91 (1984), which is hereby incorporated by reference, for example, unsubstituted polyaniline, useful forms include leucoemeraldine, protoemeraldine, emeraldine, nigraniline and tolu-protoemeraldine forms.

Useful polyanilines can be prepared through use of chemical and electrochemical synthetic procedures. For example, one form of polyaniline having at least about 160 repeat units can be prepared by treating aniline with ammonium persulfate $(NH_4)_2S_2O_8$ in excess 1M HCl. This powdered form of polyaniline is blue green in color. After methanol washing and air drying this material exhibited a conductivity of 10 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The second essential ingredient of the thermally stable polyaniline of this invention is a particular dopant solute. The purpose of the dopant is to dope a non-conductive polyaniline, and render it electrically conductive. In general, such dopant solute is derived from a compound which upon addition to the polyaniline ionizes the polymer with co-committent formation of an anionic dopant solute species. The compound from which the dopant solute is formed is of the formula:

$$[R_1-SO_3^-]_n \cdot M^{+n}$$

wherein:
$R_1$ is an organic radical;
M is a species having a positive charge equal to n; and
n is 1, 2, 3 or 4.

The following is a listing of dopants which are useful in the practice of this invention for formation of the dopant solute.
$NO_2CF_3SO_3$,
$CF_3SO_3H$,
Toluenesulfonic Acid (TsOH),
$Fe(OTs)_3$,
$Fe(CH_3SO_3)_3$,
$(FSO_3)_2$,
$AgOTs$,
$Me_3SiOTs$,
$Me_3SiOSO_2CF_3$, and
species of the formula:

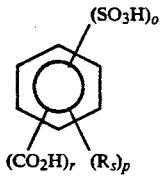

wherein:
o is 1, 2 or 3;
r is 0, 1 or 2;
p is 0, 1 or 2;
$R_5$ is substituted or unsubstituted alklyl having from 1 to about 12 carbon atoms wherein permissible substituents include halogen, cyano, sulfonic acid, carboxylic acid, and the like.

In the preferred embodiment of this invention useful dopants are those wherein:
$R_1$ is substituted or unsubstituted phenyl or alkyl wherein permissible substituents are selected from the group consisting of alkyl, halogen, phenyl haloalkyl, perhaloalkyl, cyano, nitro, alkoxy, sulfonic acid, carboxylic acid or a moiety of the formula:

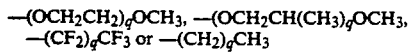

wherein:
q is a positive whole number from 1 to about 10; and
M is $H^+$ $NO^+$, $NO_2^+$, Fe(III), Pb(IV), Ce(IV), Al(III), Sr(IV), Cr(VI), Mn(VII), Co(III), Au(III), Os(-VIII), Na(I), Li(I), K(I) or $Bu_4N(I)$.

In the particularly preferred embodiments of this invention:
$R_1$ is alkyl, or alkyl substituted with one or more fluoro, sulfonic acid, nitro, cyano, or carboxyl groups, or substituted or unsubstituted phenyl wherein permissible substituents are alkyl or alkyl substituted with one or more fluoro, sulfonic acid, nitro, cyano, or carboxyl groups; and
M is $H^+$.

In the most preferred embodiments of the invention
$R_1$ is alkyl or alkyl substituted with one or more fluoro wherein said aliphatic moiety contains from about 4 to about 30 carbon atoms, preferably from about 6 to about 22 carbon atoms, phenyl or phenyl substituted with one or more substituents selected from the group consisting of fluoro, alkyl either unsubstituted or substituted with one or more fluoro, nitro, cyano, carboxyl and sulfonic acid groups; and
M is $H^+$.

The amount of dopant added to the polyaniline is not critical and may vary widely. In general, sufficient dopant is added to the polyaniline to form doped polymer which is a semi-conductor.

Usually the amount of dopant employed is at least sufficient to give a doped polymer having a conductivity of at least about $10^{-6}$ ohm$^{-1}$cm$^{-1}$. The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-4}$ ohm$^{-1}$cm$^{-1}$, and in the particularly preferred embodiments is sufficient to provide a conductivity of at least about $10^{-2}$ ohm$^{-1}$cm$^{-1}$. Amongst these particularly preferred embodiments, most preferred are those embodiments in which unsubstituted polyaniline is employed and in which sufficient dopant is employed to provide a conductivity of at least about $10^{-1}$ ohm$^{-1}$cm$^{-1}$, with amounts sufficient to provide a conductivity of from about $10^0$ ohm$^{-1}$cm$^{-1}$ to $10^1$ ohm$^{-1}$cm$^{-1}$ usually being the amounts of choice.

The method of forming the thermally stable electrically conductive polyaniline is not critical and may vary widely Suitable techniques are those described in U.S. Pat. Nos. 4,442,187 and 4,321,114. For example, such process include electrochemical doping of neutral polyaniline as described in U.S. Pat. No. 4,321,114. Another process is electrochemical polymerization of aniline and its derivatives as described in Formula I in the presence of $[R_1SO_3—]_n$ $M^{+n}$ are described in Kobayashi, Tetsuhiko, et al., *J. Electroanal. Chem.*, "Electrochemical Reactions Concerned with Electrochromism of Polyaniline Film-Coated Electrodes", 77, pp. 28-29(1984). Yet another process of forming the polyaniline of this invention involves the exchange of non-thermally stable dopants in polyaniline with $R_1SO_3—$ by methasis by contacting the polyaniline with a solution containing excess $[R_1SO_3-]$ $M^{+n}$.

Another aspect of this invention relates to a composition comprising one or more thermally stable doped electrically conductive polyanilines of this invention, and one or more thermoplastic polymers. One advantage of this composition is that because of the thermal stability of the polyanilines, articles can be fabricated from these compositions using conventional melt processing techniques. The proportion of polyaniline to thermoplastic polymer is not critical and may vary widely, depending on the uses of the composition. For example, for those uses which require the composite having higher conductivities, i.e., up to or greater than about $10^{-1}$ ohm$^{-1}$cm$^{-1}$, the amount of electrically conductive polyaniline will tend to be relatively high, as for example up to and greater than about 5 weight percent, based on the total weight of the composition. Conversely, for those uses in which lower conductivities are required, i.e., down to or less than about $10^{-6}$ ohm$^1$cm$^{-1}$, the amount of electrically conductive polyaniline will tend to be relatively low down to or less than about 5 weight percent based on the total weight of the composition. In the preferred embodiments of the invention, the amount of electrically conductive polyaniline is from about 5 to about 40 weight percent based on the total weight of the composition, and in the particularly preferred embodiments of the invention the amount of conductive polyaniline is from about 5 to about 30 weight percent on the aforementioned basis. Amongst these particularly preferred embodiments most preferred are those embodiments in which the composition comprises from about 5 to about 20 weight percent of the electrically conductive polyaniline based on the total weight of the composition.

Thermoplastic polymers for use in the formulation of the composition of this invention may vary widely. Illustrative of such polymers are polyesters such as poly(glycolic acid), poly(ethylene succinate), poly(ethylene adipate), poly(tetramethylene adipate), poly(ethylene azelate), poly(ethylene sebacate), poly(decamethylene adipate), poly(decamethylene sebacate), poly ($\alpha,\alpha$-dimethylpropiolactone), poly(pivaloyl lactone), poly(para-hydroxybenzoate), poly(ethylene oxybenzoate), poly(ethylene isophthalate), poly(ethylene terephthalate), poly(decamethylene terephthalate), poly(hexamethylene terephthalate), poly(1,4-cyclohexane dimethylene terephthalate), poly(ethylene-1,5-naphthalate), poly(ethylene-2,6-naphathalate), poly(1,4-cyclohexylidene dimethyleneteraphthalate) and the like; polyamides such as poly(4-aminobutyric acid)(nylon 4), poly(6-aminohexanoic acid)(nylon 6), poly(7-aminoheptanoic acid)(nylon 7), poly(8-aminooctanoic acid)(nylon 8), poly(9-aminononanoic acid)(nylo 9), poly(10-aminodecanoic acid)(nylon 10), poly(11-aminoundecanoic acid)(nylon 11), poly(12-aminododecanoic acid)(nylon 12), poly (hexamethylene adipamide)(nylon 6,6), poly(heptamethylene pimelamide)(nylon 7,7), poly(octamethylene suberamide)(nylon 8,8), poly(hexamethylene sebacamide), (nylon 6,10), poly(nonamethylene azelamide)(nylon 9,9), poly(decamethylene azelamide)(nylon 10,9), poly(decamethylene sebacamide)(nylon 10,10), poly[bis(4-aminocyclohexyl)metane-1,10-decanedicarboxamide](Quiana)(trans), poly(m-xylene adipamide), poly(p-xylene sebacamide), poly(2,2,2-trimethylhexamethylene terephthalamide), poly(piperazine sebacamide), poly(metaphenylene isophthalamide)(Nomex), poly(p-phenylene terephthalamide)(Kevlar), and the like; polycarbonates such as poly[methane bis(4-phenyl)carbonate], poly[1,1-ethane bis(4-phenyl)carbonate], poly[2,2-propane bis(4-phenyl)carbonate], poly[1,1-butane bis(4-phenyl) carbonate], poly[1,1-(2-methyl propane)bis(4-phenyl) carbonate], poly[2,2-butane bis(4-phenyl)carbonate], poly[2,2-pentane bis(4-phenyl)carbonate], poly[4,4-heptane bis(4-phenyl)carbonate], poly [1,1-(1-phenylethane)bis(4-phenyl)carbonate], poly[diphenylmethane bis(4-phenyl)carbonate], poly[1,1-cyclopentane bis(4-phenyl)carbonate], poly[1,1-cyclohexane bis(4-phenyl) carbonate], poly[thio bis(4-phenyl)carbonate], poly [2,2-propane bis- 4-(2-methyl phenyl) carbonate], poly [2,2-propane bis- 4-(2-chlorophenyl) carbonate], poly [2,2-propane bis- 4-(2,6-dichlorophenyl) carbonate], poly[2,2-propane bis- 4-(2,6-dibromophenyl) carbonate], poly[1,1-cyclohexane bis- 4-(2,6-dichlorophenyl) carbonate], and the like; polymers derived from the polymerization of $\alpha,\beta$-unsaturated monomers such as polyethylene, polypropylene, poly(1-butene), poly(3-methyl-1-butene), poly(1-pentene), poly(4-methyl-1-pentene), poly(1-hexene), poly(5-methyl-1-hexene), poly(1-octadecene), polyisobutylene, 1,2-poly (1,3-butadiene)(iso), 1,2-poly(1,3-butadiene)(syndio), polystyrene, poly(a-methylstyrene), poly(2-methylstyrene), poly(4-methylstyrene), poly(4-methoxystyrene), poly(4-phenylstyrene), poly(3-phenyl-1-propene), poly (2-chlorostyrene), poly(4-chlorostyrene), poly(vinyl fluoride), poly(vinyl chloride), poly(vinyl bromide), poly(vinylidene fluoride), poly(vinylidene chloride), poly(tetrafluoroethylene)(Teflon), poly(chlorotrifluoroethylene), poly(vinylcyclopentane), poly(vinylcyclohexane), poly( a-vinylnaphthalene), poly(vinyl alcohol), poly(vinyl methyl ether), poly(vinyl ethyl ether), poly(vinyl propyl ether), poly(vinyl isopropyl ether), poly(vinyl butyl ether), poly(vinyl isobutyl ether), poly(vinyl sec.-butyl ether), poly(vinyl tert.-butyl ether), poly(vinyl hexyl ether), poly(vinyl octyl ether), poly(vinyl methyl ketone), poly(methyl isopropenyl ketone), poly(vinyl formate), poly(vinyl acetate), poly(vinyl propionate), poly(vinyl chloroacetate), poly vinyl trifluoroacetate), poly(vinyl benzoate), poly(2-vinylpyridine), poly(vinylpyrrolidone), poly(vinylcarbazole), poly(acrylic acid), poly(methyl acrylate), poly(ethyl acrylate), poly(propyl acrylate), poly(isopropyl acrylate), poly(butyl acrylate), poly(isobutyl acrylate), poly(sec.-butyl acrylate), poly(tert.-butyl acrylate), poly(methacrylic acid), poly(methyl methacrylate), poly(ethyl methacrylate), poly(propyl methacrylate), poly(isopropyl methacrylate), poly(butyl methacrylate), poly(isobutyl methacrylate), poly(sec.-butyl methacrylate), poly(tert.-butyl methacrylate), poly(2-ethylbutyl methacrylate), poly(hexyl methacrylate), poly(octyl methacrylate), poly(dodecyl methacrylate), poly(octadecyl methacrylate), poly(phenyl methacrylate), poly(benzyl methacrylate), poly(cyclohexyl methacrylate), poly(methyl chloroacrylate), polyacrylonitrile, polymethacrylonitrile, polyacrylamide, poly(N-isopropylacrylamide), and the like; polydienes such as poly(1,3-butadiene)(cis), poly(1,3-butadiene) (trans), poly(1,3-butadiene)(mixt.), poly(1,3-pentadiene)(trans), poly(2-methyl-1,3-butadiene)(cis), poly (2-methyl-1,3-butadiene)(trans), poly(2-methyl-1,3-butadiene)(mixt.), poly(2-tert.-butyl-1,3-butadiene) (cis), poly(2-chloro-1,3-butadiene)(trans), poly(2-chloro-1,3-butadiene)(mixt.) and the like; polyoxides such as poly(methylene oxide), poly(ethylene oxide), poly(tetramethylene oxide), poly(ethylene formal), poly(tetramethylene formal), polyacetaldehyde, poly (propylene oxide), poly(hexene oxide), poly(octene oxide), poly(trans-2-butene oxide), poly(styrene oxide), poly(3-methoxypropylene oxide), poly(3-butoxypropylene oxide), poly(3-hexoxypropylene oxide), poly(3-phenoxypropylene oxide), poly(3-chloropropylene oxide), poly [2,2-bis(chloromethyl)-trimethylene-3-oxide] (Penton), poly(2,6-dimethyl-1,4-phenylene oxide)(PPO), poly(2,6-diphenyl-1,4-phenylene oxide)(Texax, P30), and the like; polysulphides such as poly(propylene sulphide), poly (phenylene sulphide) and the like; polysulfones such as poly[4,4'-isopropylidene diphenoxy di(4-phenylene) sulphone], and the like.

The composition of this invention may include various optional components which either fill or form a substrate for the composition to be cast from the melt. These other components may vary widely and may include any material known for use in a conductive polymer composition. Illustrative of such other components are such materials as graphite, metal conductors, reinforcing fibers, inert fillers, glass beads, clays, other conductive and non-conductive polymers, conductive ceramics, super-conductive ceramics, and the like.

The composition of this invention can be prepared using conventional techniques as for example conventional melt blending techniques. For example, such compositions can be formed by heating a mixture of the various components to a temperature which is equal to or greater than the melting point of at least one of the polymer components to form a molten intimate mixture. Thereafter the mixture can be formed into a desired article. The manner in which the molten mixture is formed is not critical and conventional methods can be employed. For example, the molten mixture can be formed through use of conventional polymer and additive blending means, in which the polymeric components are heated to a temperature equal to or greater than the melting point of a least one of the polymers, and below the degradation temperature of each of the polymers. The desired amount of the optional ingredients in a liquid or powdered form is added to the melted polymers while at the same time vigorously agitating the melt as for example by stirring or irradiating with ultrasound, or added prior to melting and mixing.

In the most preferred embodiment, the components of the initimate mixture can be granulated, and the granulated components mixed dry in a suitable mixer, as for example using ultra-sonication or a tumbler or a Branbury Mixer, or the like, as uniformly as possible. Thereafter, the composition is heated in an extruder until the polymer components are melted. As described above, the mixture is heated and is thereafter ejected with cooling.

The order of mixing of the various components of the intimate mixture is not critical. Accordingly, the order of addition of the polymers and other optional components to be desired in more detail hereinbelow, to form the initmate mixture can be varied as desired.

The electrically conductive polyaniline of the invention, and the composition of this invention can be used for any purpose for which conductive polymers are useful. Examples of articles include conductive polymer coated-housings for sensitive electronic equipment (microprocessors), infrared and microwave absorbing shields, flexible electrical conducting connectors, conductive bearings, brushes and semiconducting photoconductor junctions, antistatic materials for packaging electronic components, carpet fibers, waxes for floors in computer rooms and thin, optically transparent antistatic finishes for CRT screens, aircraft, auto windows and the like.

The following specific examples are presented to more particularly illustrate the invention, and should not be construed as being limitations on the scope and spirit of the invention.

EXAMPLE 1

Preparation of Thermally Stable Conductive Polyaniline Containing p-Toluenesulfonate Anion as Dopant To 0.05 mole of p-toluene sulfonic acid hydrate in 100 mL of water was added 0.05 mole of aniline. To this solution at 0° C. was then added 0.075 mole of ammonium persulfate in 20 mL of water. After stirring for 20 min., the yellow solution was allowed to warm to room temperature and stirring was continued for another 16 hr. The green precipitate was filtered, washed twice with a 0.1M p-toluenesulfonic acid solution in water, three times with water, then twice with methanol, then air dried. Yield was 2.6 g. A compacted-powder pellet, 12.7 mm diameter by 1 mm thick, exhibited a 4-probe conductivity of 0.7 S/cm (ohm$^{-1}$cm$^{-1}$). Elemental analysis gave 64.03% C, 5.42% H, 9.43% N, 7.44% S, and 12.02% O. Empirical formula $C_6H_4N_1$ (OTs)$_{0.27}$(HSO$_4$)$_{0.07}$ (OTS=p-toluenesulfonic acid). Thermogravimetric analysis (TGA) under argon shows only a 2% wt loss up to 300° C. and a 5% wt loss up to 400° C. Major weight loss begins at 425° C. with 55% of the original weight remaining at 700° C.

EXAMPLE 2

Preparation of p-Toluenesulfonate Doped Poly-Aniline by Treatment of the Emeraldine Base Form of Polyaniline with p-Toluenesulfonic Acid To 50 mL of a 1M p-toluenesulfonic acid solution in water was added 1.0 g of the Emeraldine base form of powdered polyaniline. The suspension was stirred for 1 hour at room temperature, filtered, washed twice with 1M p-toluenesulfonic acid, twice with water (25 mL), then twice with methanol, and air dried. A compacted-powder pellet 12.7 mm dia.×1 mm thick gave four-probe conductivity of 0.5 S/m. TGA analysis on this material showed similar weight loss behavior to that of material prepared as in Example 1.

EXAMPLE 3

Preparation of p-Toluenesulfonate Doped Polyaniline by Exchange of Dopant Ion in Polyaniline Hydrochloride With p-Toluene Sulfonate Anion.

To 50 mL of 1M p-toluene sulfonic acid solution in water was added 1.0 g of polyaniline hydrochloride (original conductivity of 5 S/cm). The suspension was stirred for one day at room temperature, filtered and the solid was washed with 1M toluene sulfonic acid solution then water and air-dried. A compacted pellet exhibited a 4-probe conductivity of 0.5 S/cm. TGA analysis show similar weight loss behavior as that of sample from Example 2.

COMPARATIVE EXAMPLE I (A) Preparation of Polyaniline Chloride

Into a one liter erlenmeyer flask equipped with a magnetic stirring bar was placed 750 mL of 1M HCl and 29 g of distilled aniline. After the aniline dissolved, a solution of 35.6 g of ammonium persulfate in 80 mL of water was added with cooling. After three hours at room temperature, the dark solids were filtered, washed three times with mL of 1M HCl, twice with 200 mL water, and once with 200 mL of methanol. The solids were air dried to give 13 g of polyaniline chloride. A pressed pellet 7 mm (diameter) by 1 mm (thickness exhibited a 4-point probe conductivity of 10.2 S/cm.

(B) Thermal Studies on Polyaniline Chloride

One gram of the above polyaniline chloride with a conductivity of 10.2 S/cm was heated to 100° C. under vacuum for 2 hours. The sample lost 14% of its weight and its conductivity (pressed pellet, 4-point probe) dropped to 0.7 S/cm.

Another 1 gram sample was heated to 200° C. under vacuum for 2 hours. This sample lost 24% of its weight and its conductivity (pressed pellet, 4-point probe dropped to $7 \times 10^{-7}$ S/cm.

COMPARATIVE EXAMPLE II

Thermograrimetric Analyses (TGA) of Polyaniline Chloride and Polyaniline Tosylate An experiment was carried out to compare the thermal stability of the thermally stable polyaniline of this invention and conventional doped polyaniline. The polyaniline of this invention was doped with tosylate anions and was prepared as described in EXAMPLE I. The conventional polyaniline was doped with chloride anions and was prepared as in Comparative Examples I.

Figure 2:
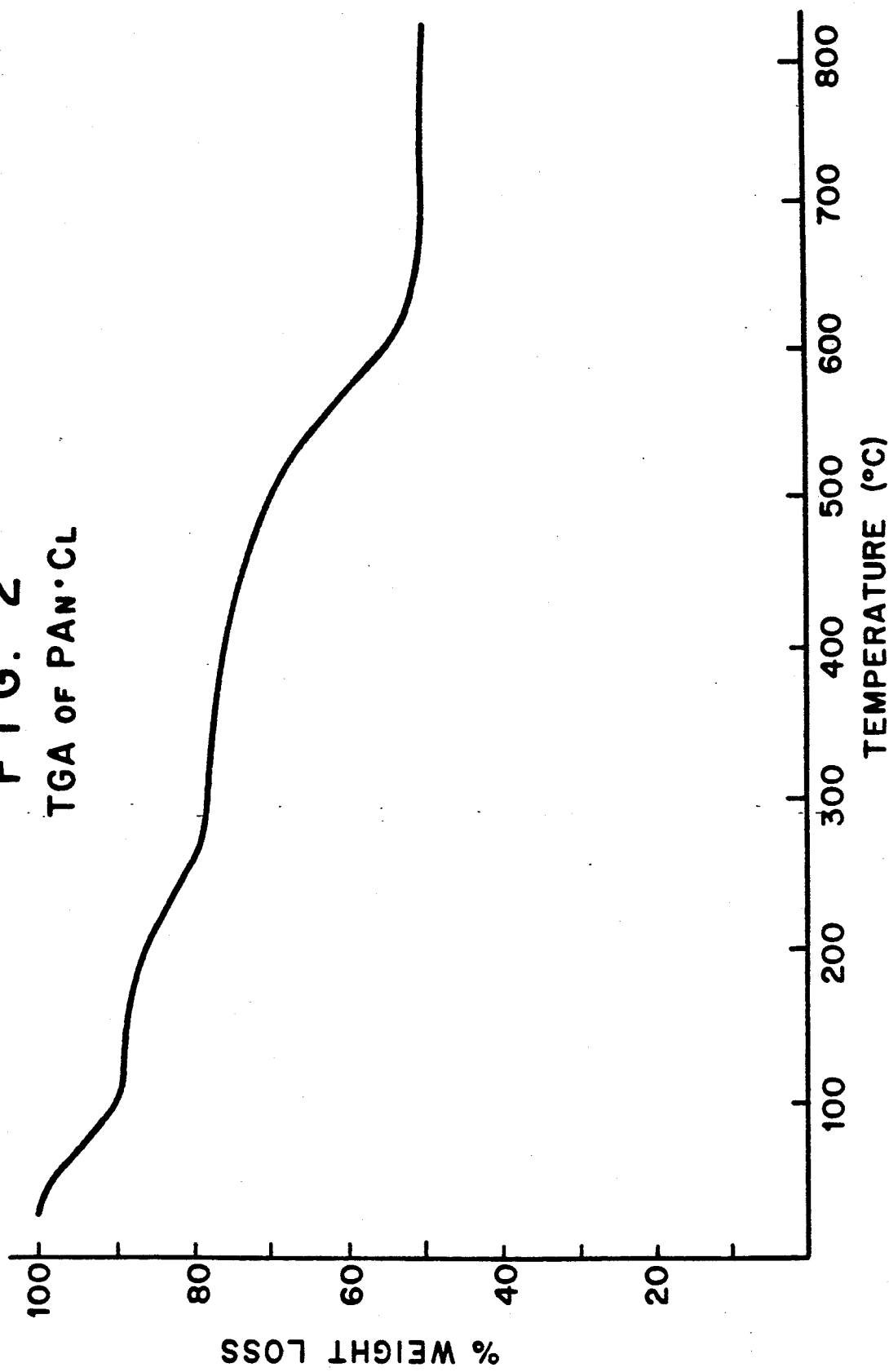
FIG. 2 is a graph showing % weight loss as a function of temperature for polyaniline doped with chloride anions.

Samples of polyaniline chloride and polyaniline tosylate were analyzed by TGA under argon to determine their stability to weight loss (dopant loss). The results of this experiment are set forth in FIGS. 1 and 2. At a 10° C./min heating rate, the sample of polyaniline chloride exhibited two weight-loss steps, one between room temperature and 100° C. (11% wt loss) and the other between 125° C. and 300° C. (dopant loss) (14% wt loss). (See FIG. 1) Subjecting a sample of polyaniline tosylate to the same analysis showed that it did not loose any weight up to 300° C. (See FIG. 2) Thus, polyaniline tosylate is much more thermally stable to dopant loss than polyaniline chloride.

Because of the relatively high thermal stability of the polyaniline of this invention, this material is useful as an additive in melt processing many conventional polymers such as nylon, polyethylene terephthalate, polyethylene, polypropylene and the like. This thermal stability also allows the melt processing of the conductive polymers of this invention.

However, conventional forms of polyaniline are not suitable for melt blending with most common polymers such as polyethylene or polypropylene. The conductive properties of the polyaniline additive will be lost during the compounding and heating process accompanied by the release of corrosive acids.

What is claimed is:

1. An electrically conductive thermally stable polymer comprising a substituted or unsubstituted polyaniline of film forming molecular weight prepared by polymerizing an aniline of the formula:

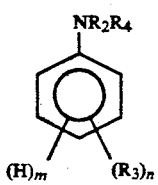

having dispersed therein a dopant solute of the formula:

in an amount sufficient to provide a doped polyaniline having a conductivity of at least about $10^{-5} ohm^{-1} cm^1$, wherein:

$R_1$ is a substituted or unsubstituted organic radical;
n is an integer from 0 to 4;
m is an integer from 0 to 5 with the proviso that the sum of n and m is 5;
$R_2$ and $R_4$ are the same or different at each occurrence and are hydrogen or alkyl; and
$R_3$ is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alksilyl, arylsulfonyl, carboxylic acid, halogen, cyano, or alkyl substituted with one or more sulfonic acid, carboxylic acid, halogen cyano or epoxy moieties; or any two $R_3$ substituents taken together are an alkylene or alkenylene group completing a 3, 4, 5, 6 or 7 membered aromatic or alicyclic carbon ring or any two $R_3$ substitutents together may form an alkylene or alkenylene group completing a 3, 4, 5, 6 or 7 membered aromatic or alicyclic ring structure which includes one or more divalent ester, carbonyl, nitrogen, sulfur, sulfinyl, sulfonyl or oxygen, or $R_3$ is an aliphatic moiety having repeat units of the formula:

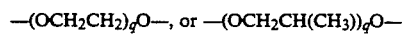

wherein q is a positive whole number; with the proviso that $R_1$, $R_2$, $R_3$ and $R_4$ substituents individually include from 1 to about 30 carbon atoms.

2. A material according to claim 1 wherein said polyaniline is of the formula:

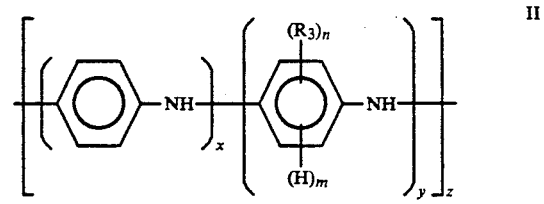

or

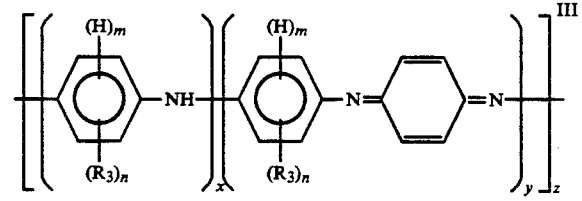

or

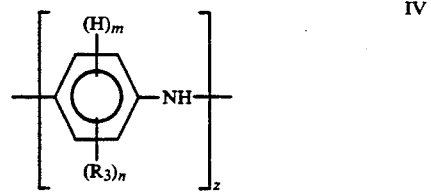

or

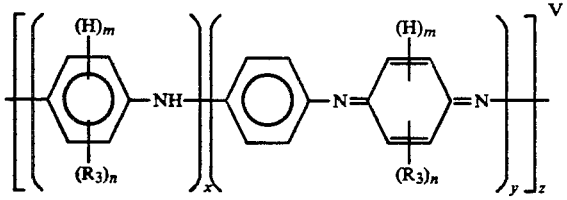

wherein:

x is an integer equal to or greater than about 2;

y is equal to or greater than 0, with the proviso that the ratio of x to y is greater than or equal to about 2;

z is equal to or greater than about 4;

n is an integer from 0 to 4;

m is an integer from 0 to 5 with the proviso that the sum of n and m is 5;

$R_3$ is the same or different at each occurrence and is alkyl, alkenyl, alkyoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alkylsilyl, arylsulfonyl, carboxylic acid, halogen, cyano, sulfonic acid, or alkyl substituted with one or more sulfonic acid, carboxylic acid, halogen, nitro, cyano or epoxy moieties; or carboxylic acid, halogen, nitro, cyano, or sulfonic acid moieties; or any two R substituents taken together are an alkylene or alkenylene group completing a 3, 4, 5, 6 or 7 membered aromatic or alicyclic carbon ring or any two $R_3$ substitutents together may form an alkylene or alkenylene group completing a 3, 4, 5, 6 or 7 membered aromatic or alicyclic ring structure which structures one or more divalent nitrogen, ester, carbonyl, sulfur, sulfinyl, sulfonyl or oxygen.

3. A material according to claim 1 where m is equal to 5 and n is 0.

4. A material according to claim 2 wherein $R_3$ is the same or different at each occurrence and is alkyl or alkoxy having from 1 to about 12 carbon atoms, cyano, halogen or alkyl substituted with carboxylic acid or sulfonic acid substituents.

5. A material according to claim 4 wherein $R_3$ is the same or different at each occurrence and is alkyl or alkoxy having from 1 to about 4 carbon atoms, or substituted having from 1 to about 4 carbon atoms wherein permissible substituents are alkyl, carboxylic acid and sulfonic acid substituents.

6. A material according to claim 5 wherein $R_3$ is the same or different at each occurrence and is alkyl having from 1 to about 4 carbon atoms.

7. A material according to claim 4 wherein n is 1 to 4.

8. A material according to claim 2 wherein n is 1 to 3.

9. A material according to claim 1 wherein $R_1$ is a moiety of the formula:

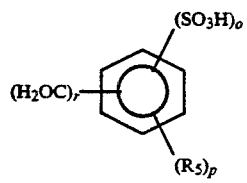

wherein:

o is 1, 2 or 3;

r and p are the same or different and are 0, 1 or 2;

$R_5$ is cyano, fluoro or substituted or unsubstituted alkyl having from 1 to about 12 carbon atoms wherein permissible substituents are fluoro, cyano, sulfonic acid and carboxylic acid.

10. A material according to claim 9 wherein:

o is 1 or 2;

r and p are the same or different and are 0 or 1;

$R_5$ is alkyl, fluoro, alkyl substituted with one or more fluoro, or cyano.

11. A material according to claim 10 wherein:

o is 1;

r is 0;

p is 1; and $R_5$ is alkyl, fluoro or alkyl substituted with one or more fluoro substituents.

12. A material according to claim 11 wherein said dopant solute is $p—CH_3C_6H_4SO_3^-$.

13. A material according to claim 13 wherein z is equal to or greater than about 10.

14. A material according to claim 13 wherein z is equal to or greater than about 20.

15. A material according to claim 14 wherein z is equal to or greater than about 30.

16. A material according to claim 2 wherein x is from about 4 to about 8, with the proviso that the ratio of x to y is at least about 2.

17. A material according to claim 16 wherein x is from about 4 to about 8 and y is from about 0 to about 2, with the proviso that the ratio of x to y is at least about 2.

18. A material according to claim 17 wherein x is 4 and y is 2.

19. A material according to claim 1 wherein said conductivity is at least about $10^{-4}$ ohm$^{-1}$cm$^{-1}$.

20. A material according to claim 19 wherein said conductivity is at least about $10^{-3}$ ohm$^{-1}$cm$^{-1}$.

21. A material according to claim 20 wherein said conductivity is at least about $10^{-2}$ ohm$^{-1}$cm$^{-1}$.

22. A material according to claim 21 wherein said conductivity is at least about $10^{-1}$ ohm$^{-1}$cm$^{-1}$.

23. A material according to claim 22 wherein said conductivity is at least about $10^0$ ohm$^{-1}$cm$^{-1}$.

24. A material according to claim 23 wherein said conductivity is at least about $10^1$ ohm$^{-1}$cm$^{-1}$.

25. A thermally stable electrically conductive doped polyaniline comprising an ionized polyaniline backbone polymer and a dopant solute species selected from the group consisting of $R_1SO_3^-$ wherein $R_1$ is a substituted or unsubstituted organic radical.

26. A thermally stable electrically conductive doped polyaniline according to claim 25 wherein said polyaniline backbone polymer is of the formula:

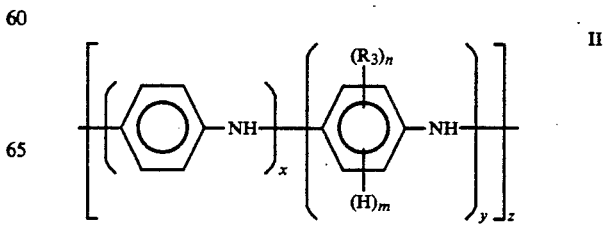

-continued
or

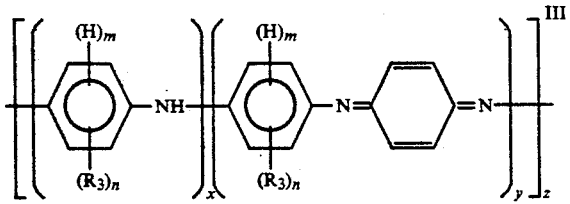

or

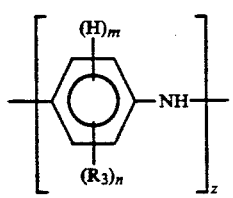

or

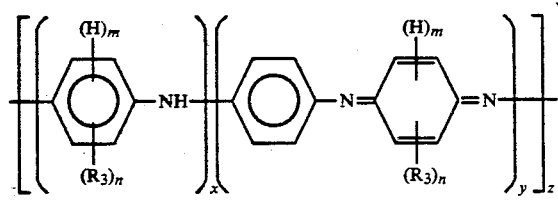

wherein:
x is an integer equal to or greater than 2;
y is equal to or greater than 0, with the proviso that the ratio of x to y is greater than about 2;
z is equal to or greater than about 1;
n is an integer from 0 to 4;
m is an integer from 0 to 5 with the proviso that the sum of n and m is 5;
$R_3$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alkylsilyl, arylsulfonyl, carboxylic acid, halogen, nitro, cyano, or sulfonic acid moieties; or any two R substituents taken together are an alkylene or alkenylene group completing a 3, 4, 5, 6 or 7 membered aromatic or alicyclic carbon ring, which ring may optionally include one or more divalent nitrogen, ester, carbonyl, sulfur, sulfinyl, sulfonyl or oxygen.

27. A thermally stable electrically conductive doped polyaniline according to claim 26 wherein z is equal to or greater than 4.

28. A material according to claim 1 wherein $R_1$ is aromatic.

29. A material according to claim 1 wherein $R_1$ is aliphatic.

30. A material according to claim 1 wherein $R_1$ is substituted or unsubstituted naphthyl, anthryl, phenanthryl, biphenyl, phenyl or alkyl wherein permissible substituents are selected from the group consisting of alkyl, halogen, phenyl, haloalkyl, perhaloalkyl, cyano, alkoxy, sulfonic acid, carboxylic acid or a moiety of the formula:

—$(OCH_2CH_2)_qOCH_3$,
—$(OCH_2CHCCH_3)_qOCH_3(CF_2)_qCF_3$ or
—$(CH_2)_qCH_3$ wherein:
q is a positive whole number from 1 to about 10.

31. A material according to claim 30 wherein $R_1$ is substituted or unsubstituted naphthyl, phenyl or alkyl.

32. A material according to claim 43 wherein $R_1$ is substituted or unsubstituted phenyl or alkyl.

33. A material according to claim 32 wherein $R_1$ is alkyl, alkyl substituted with one or more fluoro, sulfonic acid, cyano, or carboxylic acid, or substituted or unsubstituted phenanthryl, anthryl, biphenyl, phenyl or naphthyl wherein permissible substituents are carboxylic acid, fluoro, sulfonic acid, alkyl or alkyl substituted with one or more substituents selected from the group consisting of fluoro, sulfonic acid, cyano or carboxylic acid.

34. A material according to claim 33 wherein $R_1$ is substituted or unsubstituted naphthyl, alkyl or phenyl.

35. A material according to claim 34 wherein $R_1$ is substituted or unsubstituted phenyl or alkyl.

36. A composition according to claim 25 wherein said polyaniline is of the formula:

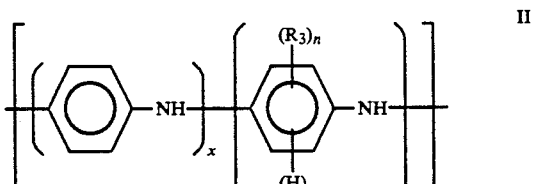

or

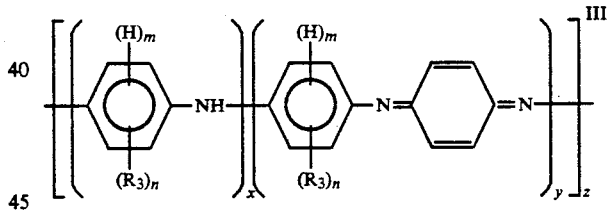

or

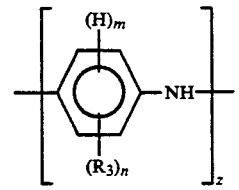

or

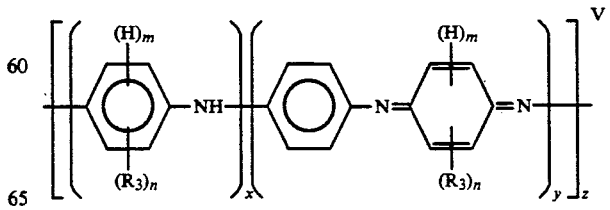

wherein:
x is an integer equal to or greater than about 2;

y is equal to or greater than 0, with the proviso that the ratio of x to y is equal to or greater than about 2;

z is equal to or greater than about 4;

n is an integer from 0 to 4;

m is an integer from 0 to 5 with the proviso that the sum of n and m is 5;

R$_3$ is the same or different at each occurrence alkyl, alkenyl, alkyoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alkylsilyl, arylsulfonyl, carboxylic acid, halogen, cyano, sulfonic acid, or alkyl substituted with one or more sulfonic acid, carboxylic acid, halogen, cyano or epoxy moieties; or carboxylic acid, halogen, cyano, or sulfonic acid moieties; or any two R substituents taken together are an alkylene or alkenylene group completing a 3, 4, 5, 6 or 7 membered aromatic or alicyclic carbon ring or any two R$_3$ substituents together may form an alkylene or alkenylene group completing a 3, 4, 5, 6 or 7 membered aromatic or alicyclic ring structure which includes one or more divalent nitrogen, ester, carbonyl, sulfur, sulfinyl, sulfonyl or oxygen.

37. A composition according to claim 36 wherein m is equal to 5 and n is 0.

38. A composition according to claim 36 wherein R$_3$ is the same or different at each occurrence and is alkyl or alkoxy having from 1 to abut 12 carbon atoms, cyano, halogen or alkyl substituted with carboxylic acid or sulfonic acid substituents.

39. A composition according to claim 38 wherein R$_3$ is the same or different at each occurrence and is alkyl having from 1 to about 4 carbon atoms.

40. A composition according to claim 36 wherein n is 0 to 3.

41. A composition according to claim 36 wherein R$_1$ is aromatic.

42. A composition according to claim 36 wherein R$_1$ is aliphatic.

43. A composition according to claim 36 wherein R$_1$ is substituted or unsubstituted naphthyl, biphenyl, anthryl, phenanthryl, phenyl or phenyl wherein permissible substituents are selected from the group consisting of alkyl, halogen, phenyl, haloalkyl, perhaloalkyl, cyano, alkoxy, sulfonic acid, carboxylic acid or a moiety of the formula:

—(OCH$_2$CH$_2$)$_q$OCH$_3$,
—(OCH$_2$CHCCH$_3$)$_q$OCH$_3$(CF$_2$)$_q$CF$_3$ or
—(CH$_2$)$_q$CH$_3$ wherein:

q is a positive whole number from 1 to about 10.

44. A composition according to claim 43, wherein R$_1$ is substituted or unsubstituted naphthyl, phenyl or alkyl.

45. A composition according to claim 44 wherein R$_1$ is substituted or unsubstituted phenyl or alkyl.

46. A composition according to claim 43 wherein R$_1$ is alkyl, alkyl substituted with one or more fluoro, sulfonic acid, cyano, or carboxylic acid, or substituted or unsubstituted phenanthryl, biphenyl, anthryl, phenyl or naphthyl wherein permissible substituents are fluoro, sulfonic acid, carboxylic acid, alkyl or alkyl substituted with one or more substitutents selected from the group consisting of fluoro, sulfonic acid, cyano or carboxylic acid.

47. A composition according to claim 46 wherein R$_1$ is substituted or unsubstituted naphthyl, alkyl or phenyl.

48. A composition according to claim 47 wherein R$_1$ is substituted or unsubstituted phenyl or alkyl.

49. A composition according to claim 48 wherein said dopant is p—CH$_3$C$_6$H$_4$—SO$_3$$^-$.

50. A composition according to claim 36 wherein said dopant is a moiety of the formula:

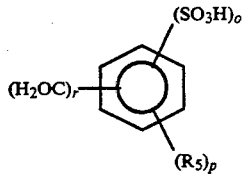

wherein:

o is 1, 2 or 3;

r and p are the same or different and are 0, 1 or 2;

R$_5$ is cyano, fluoro or substituted or unsubstituted alkyl having from q to about 12 carbon atoms wherein permissible substituents are fluoro, cyano, sulfonic acid and carboxylic acid.

51. A composition according to claim 50 wherein:

o is 1 or 2;

r and p are the same or different and are 0 or 1;

R$_5$ is alkyl, fluoro, alkyl substituted with one or more fluoro, or cyano.

52. A composition according to claim 51 wherein:

o is 1;

r is 0;

p is 1; and

R$_5$ is alkyl, fluoro or alkyl substituted with one or more fluoro substituents.

53. A material according to claim 36 wherein z is equal to or greater than about 10.

54. A material according to claim 53 wherein z is equal to or greater than about 20.

55. A composition according to claim 54 wherein x is equal to or greater than about 30.

56. A composition according to claim 36 wherein x is from about 4 to about 8, with the proviso that the ratio of x to y is at least about 2.

57. A composition according to claim 56 wherein x is from about 4 to about 8 any y is from about 0 to about 2, with the proviso that the ratio of x to y is at least about 2.

58. A composition according to claim 57 wherein x is 4 and y is 2.

59. A composition according to claim 36 wherein said composition contains sufficient doped polymer to provide a composition having a conductivity of at least about $10^{-4}$ ohm$^{-1}$cm$^{-1}$.

60. A composition according to claim 59 wherein said conductivity is at least about $10^{-3}$ ohm$^{-1}$cm$^{-1}$.

61. A composition according to claim 60 wherein said conductivity is at least about $10^{-2}$ ohm$^{-1}$cm$^{-1}$.

62. A composition according to claim 61 wherein said conductivity is at least about $10^{-1}$ ohm$^{-1}$cm$^{-1}$.

63. A composition according to claim 62 wherein said conductivity is at least about $10^{0}$ ohm$^{-1}$cm$^{-1}$.

64. A composition according to claim 59 wherein said conductivity is at least about $10^{-1}$ ohm$^{-1}$cm$^{-1}$.

* * * * *

UNITED STATES PATENT AND TRADEMARK OFFICE
CERTIFICATE OF CORRECTION

PATENT NO. : 5,069,820
DATED : December 3, 1991
INVENTOR(S) : Kwan-Yee A. Jen, et. al.

It is certified that error appears in the above-indentified patent and that said Letters Patent is hereby corrected as shown below:

Column 19, line 8, "occurrence alkyl" should read --occurrence and is alkyl--.

Signed and Sealed this

Twenty-eighth Day of June, 1994

Attest:

BRUCE LEHMAN

*Attesting Officer*  *Commissioner of Patents and Trademarks*